(12) United States Patent
Nemoto et al.

(10) Patent No.: US 9,409,316 B2
(45) Date of Patent: Aug. 9, 2016

(54) DEVICE FOR FORCIBLY INSERTING DROP INTO COMPRESSION MOLDING MACHINE, AND MOLDING DIE FOLLOW-UP TYPE DEVICE FOR SUPPLYING DROP

(71) Applicant: TOYO SEIKAN KAISHA, LTD., Chiyoda-ku, Tokyo (JP)

(72) Inventors: Satoru Nemoto, Yokohama (JP); Shoichiro Takano, Yokohama (JP); Hiroyuki Hashimoto, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 528 days.

(21) Appl. No.: 13/766,245

(22) Filed: Feb. 13, 2013

(65) Prior Publication Data

US 2013/0181368 A1 Jul. 18, 2013

Related U.S. Application Data

(62) Division of application No. 10/564,445, filed as application No. PCT/JP2004/010263 on Jul. 13, 2004.

(30) Foreign Application Priority Data

Jul. 14, 2003 (JP) .................................. 2003-196830
Oct. 28, 2003 (JP) .................................. 2003-368001

(51) Int. Cl.
*B29B 11/02* (2006.01)
*B29B 11/12* (2006.01)
(Continued)

(52) U.S. Cl.
CPC ................. *B29B 11/02* (2013.01); *B29B 11/12* (2013.01); *B29C 31/048* (2013.01); *B29C 43/08* (2013.01); *B29C 43/34* (2013.01); *B29C 2043/3288* (2013.01); *B29C 2043/3411* (2013.01);
(Continued)

(58) Field of Classification Search
None
See application file for complete search history.

(56) References Cited

U.S. PATENT DOCUMENTS 4,141,680 A 2/1979 Kauffman et al.
4,312,437 A 1/1982 Suzuki et al.
(Continued)

FOREIGN PATENT DOCUMENTS

JP 2000-025729 A 1/2000
JP 2000-108127 A 4/2000
JP 2000-280248 A 10/2000

OTHER PUBLICATIONS

International Search Report of International Patent Application No. PCT/JP2004/010263, date of mailing Oct. 26, 2004.

*Primary Examiner* — Benjamin Schiffman
(74) *Attorney, Agent, or Firm* — Westerman, Hattori, Daniels & Adrian, LLP

(57) ABSTRACT

A method and device for continuously supplying molten synthetic resin drops into female moldings which are rotatingly movable for manufacturing moldings, wherein synthetic resin in molten condition extruded from an extrusion opening is cut by a cutter attached to a holding mechanism to form the molten resin into drops in a determined quantity, the drops are held and conveyed by the holding mechanism, and the drops are forcibly inserted and supplied into the concaves of the female moldings. At that time the holding mechanism on the rotary- and movable type drop supply is made to approach the rotating molding die and the rotation path of the holding mechanism is made to overlap with that of the molding die within a determined area to make the movement of the holding mechanisms follow that of the molding die.

5 Claims, 12 Drawing Sheets

(51) Int. Cl.
 *B29C 31/04* (2006.01)
 *B29C 43/08* (2006.01)
 *B29C 43/34* (2006.01)
 *B29C 43/32* (2006.01)

(52) U.S. Cl.
 CPC . *B29C2043/3466* (2013.01); *B29C 2043/3494* (2013.01)

(56) References Cited

U.S. PATENT DOCUMENTS

| | | |
|---|---|---|
| 6,123,880 A | 9/2000 | Ingram |
| 6,152,723 A | 11/2000 | Winter et al. |
| 6,422,379 B1 | 7/2002 | Zoppas |
| 6,514,448 B1 | 2/2003 | Vogel et al. |
| 2002/0088767 A1 | 7/2002 | Saito et al. |
| 2002/0093126 A1 | 7/2002 | Choinski |

Figure 5-A
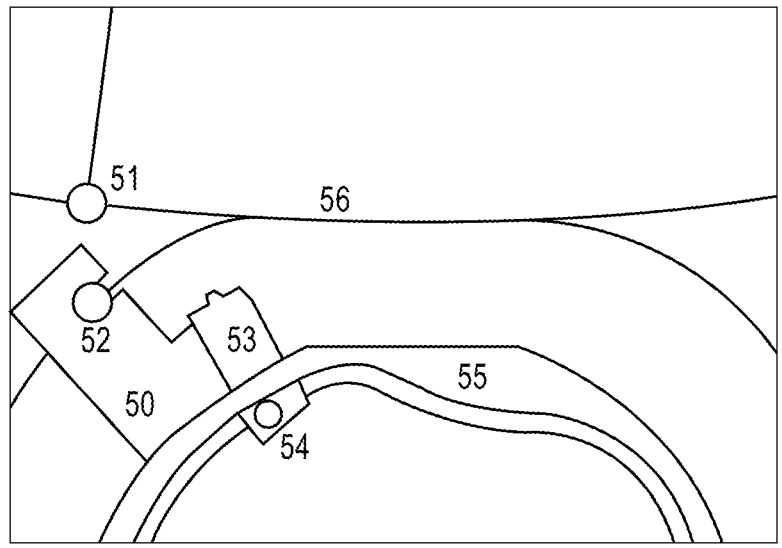
Figure 5-B
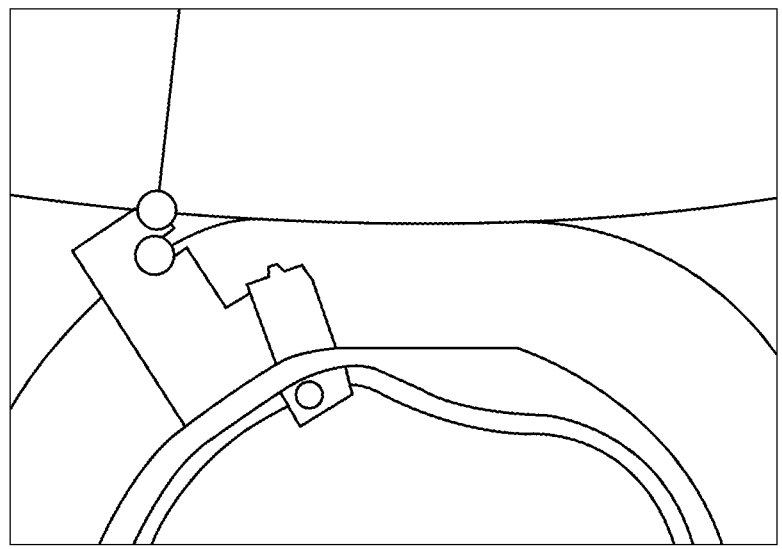

Figure 5-C
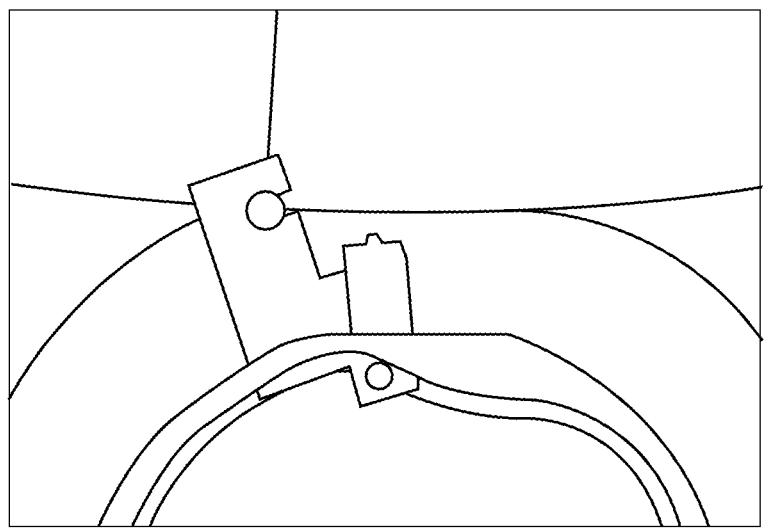
Figure 5-D
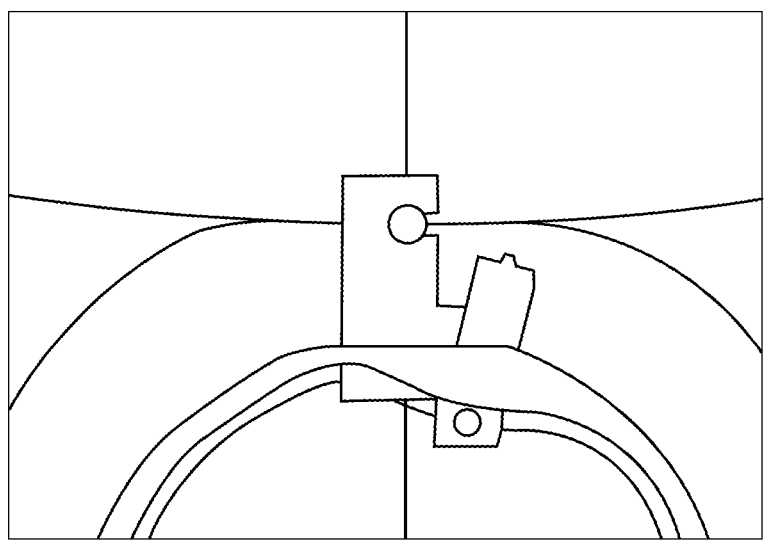

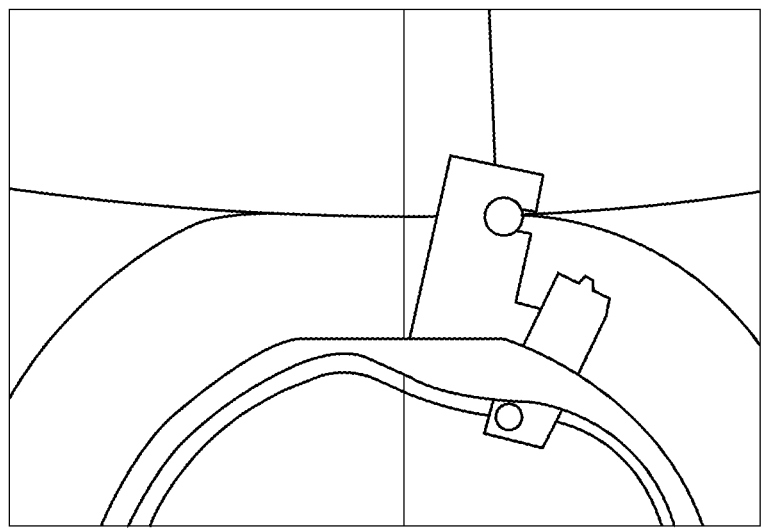
Figure 5-E
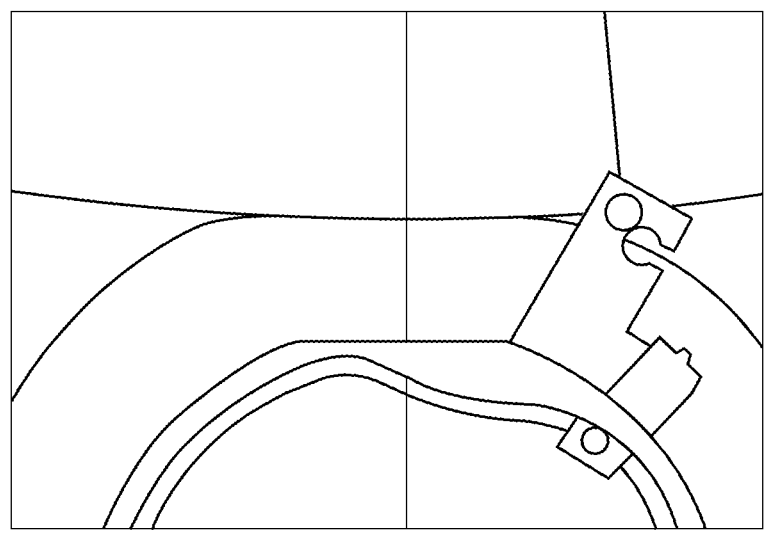
Figure 5-F

DEVICE FOR FORCIBLY INSERTING DROP INTO COMPRESSION MOLDING MACHINE, AND MOLDING DIE FOLLOW-UP TYPE DEVICE FOR SUPPLYING DROP

CROSS-REFERENCE TO RELATED APPLICATIONS

This is a divisional application of U.S. patent application Ser. No. 10/564,445, filed on Aug. 17, 2006, which is a 371 of International Application No. PCT/JP2004/010263, filed on Jul. 13, 2004, which claims the benefit of priority from the prior Japanese Patent Application Nos. 2003-196830, filed on Jul. 14, 2003 and 2003-368001 filed on Oct. 28, 2003, the entire contents of which are incorporated herein by references.

TECHNICAL FIELD

The present invention relates to a method and device for supplying molding materials, i.e. drops (lumps of the molten synthetic resin) into molding dies continuously in a compression molding machine for synthetic resin, and the present invention specifically relates to a method and device for supplying drops in order to continuously, accurately and rapidly supply molten drops extruded from an extrusion die head into female cavities (female concaves) of a compression molding machine when preforms for molding synthetic resin containers and so on are molded continuously by a rotary-type compression molding machine.

BACKGROUND ART

Plastic containers have been conveniently used in not only daily life but also industrial world due to their lightness in weight, economic efficiency, ease of molding, transparency and so on. Among such plastic containers, polyester resin containers, which are versatile as containers for daily use for drinking water, food and the like, especially containers molded from polyethylene terephthalate (PET) whose heat resistance, pressure tightness, flavor-hold properties, etc. have been particularly improved recently, have been the most highly-demanded containers for soft drinks or beverages, and these PET containers are quite regularly used by consumers as potable small containers and containers for hot drinks.

As stated above, synthetic resin containers as represented by polyethylene terephthalate, which play very important roles as containers for drinking water and food, are efficiently manufactured by blow molding usually, which blow fluid into molding dies of preliminarily molded preforms (bottomed cylindrical molding materials; parisons) to carryout expansion molding.

Preforms, as preliminary moldings of plastic containers, have been molded mainly with the use of multi-cavity molds by injection molding and then by blow molding conventionally, but better methods for manufacturing have been longed because price-reduction of molding device, increased production efficiency, transition to low-temperature molding or the like have been demanded.

On the other hand, compression molding machines are traditionally known as molding devices which enable molding at relatively lower cost compared with that in molding by injection molding machines and at relatively lower temperature, while there was a defect that they cannot perform serial production. In response to the defect, a rotary compression molding machine (a rotary- and movable type compression molding machines) has been developed and applied wherein plurality of molding dies are mounted on a rotating disk (see e.g. Japanese Laid-Open Patent Application No. 60-245517), in order to enhance their mass productivity to improve production efficiency.

In molding of such preforms, in order to improve production efficiency further, methods for manufacturing were developed, which use rotary-type material supplies by extrusion molding and rotary type-compression molding machines in performing molding by compression molding (see, Japanese Laid-Open Patent Application Nos. 2000-25729 and 2000-108127). Therefore, production efficiency was improved dramatically by applying rotary-type material supply by extrusion molding and rotary-type compression molding machines. Recently, methods for molding by extrusion-compression molding has been attached the highest importance in preform manufacture.

The molding devices for performing this method for molding preforms are excellent in economic efficiency and production efficiency, which requires continuous material supply (drop insertion) wherein the molten drops extruded from an extrusion die head are rapidly and accurately inserted into female cavities in the compression molding machine which is moving with rotation. Without accuracy, it is impossible to obtain precise preforms since a part of drops overbrim the cavity.

Therefore, performing continuous supply and insertion of the drop more rapidly and accurately has become an important problem in continuous production device of preforms by compression molding machines, however, disclosure of the modified technology aiming at solution of this problem has not seldom been suggested yet, and there are only a few disclosures, e.g. that of modified device wherein a synthetic-resin guiding means having a reverse frustum configuration and having a guiding opening at the drop point of the drop, is provided (see, Japanese Laid-Open Patent Application No. 2000-280248).

As mentioned above, in the molding device for preforms to perform blow molding of synthetic resin containers, it is important to continuously supply molten drops (to insert drops), rapidly and accurately, extruded from an extrusion die head into the female concaves in a compression molding machine which moves with rotation, when adopting manufacturing the devices using rotary-type material supply by extrusion molding and a rotary-type compression molding machine, in order for price-reduction of molding device, increased production efficiency, transition to low-temperature molding or the like. Thus, the problem to be solved in the present invention is to develop technique which enables more accurate and rapid continuous supply.

DISCLOSURE OF THE INVENTION

In the molding devices of preforms using rotary-type material supply by extrusion molding and a rotary-type compression molding machine as previously disclosed in patent literatures, basically molten drops extruded from an extrusion die head can be inserted without fail into the female concaves of compression molding device which moves with rotation, but there is a tendency that drops may be displaced from the required positions in the female concaves and fall form there, when the difference between the maximum external diameter of the drops and the inner diameter of the female concaves is relatively small or when the moving rate of drop-holding mechanism is raised. However, this problem has been solved to some extent by the proposed modification for setting the synthetic-resin guiding means which has a reverse frustum configuration, as shown in the patent literatures mentioned above.

The present inventors looked from various angles repeatedly and continued experimental consideration with the aim of developing an additionally modified technique to insert the drops more accurately and rapidly, while preventing the drops from displacement from the required positions in the female concaves and drop, even when the difference between maximum external diameter of the drops and the inner diameter of the female concaves is smaller or even when the moving rate of the drop-holding mechanism is raised more, or even the molding cycle is performed much faster by raising the rotation rate of the rotary-type compression molding machine, and in seeking for novel modified technique in various ways such as a molding supply of drops, a drop-holding mechanism, a drop and insertion means of the drop, a molding cycle and so on. In consequence, the present inventors found the technique with which the drop insertion can be performed more accurately and rapidly.

In this novel technique, as the result of the consideration of the means for contriving drop of the drops wherein the drops are dropped in a different way than the conventional free drop, the present inventors could achieve the novel recognition that forcible drop of the drops instead of free fall settles the direction of drop forcibly, which allows accurate and rapid insertion of the drops into female concaves. Specifically, the means uses a technique for dropping drops which drops at an accelerating speed or at a constant speed by lowering the holding mechanism suddenly or at a constant speed with the use of acceleration or law of inertia, when the holding function of the holding mechanism of the drop is released to drop the drops. The technique is to be the first basic constituent of the present invention, which only requires attachment of a driven-type lift of the holding mechanism. Thus, the additional instrument may have a simple configuration and cost low.

Further, the present inventors conceived that the drops can be inserted more accurately, when the drops are dropped in the overlapped paths in this novel technique, since a rotation path of a rotary- and movable type drop supply having many holding mechanisms overlaps with a rotation path of a rotary- and movable type having many molds in a rotary-type compression molding machine. Still further, in the process of repeating discussion and experiments for seeking development of additionally modified technique, in order to supply the drops more accurately rapidly and simply, the present inventors considered carefully: that applying the technique for making the movement of the holding mechanism follow that of the female mold by overlapping these paths of rotation is very effective in even more accurate and rapid insertion of the drop; that using the technique by the innovative idea causes less displacement of the drop-holding mechanism from the required positions in the female concaves, while dropping the drop by releasing the drop-holding of the holding mechanism can realize insertion of the drop more completely accurately at the time point when the position of the holding mechanism overlap with that of the female mold during the time when the rotation path of the holding mechanism overlaps with that of the female mold by making the movement of the holding mechanism follow, even if time lag may occur regarding the positions of the holding mechanism and the female mold on the overlapping rotation paths; and further a windowtime generated by the overlapping paths may also ensure accuracy of insertion of the drops complementarily. From this consideration, the present inventors could obtain finding as innovative and novel creative technique. The present invention was thus created.

The specific technique is to be the second basic constituent of the present invention, in which the drop point of the drop by releasing the drop-holding function of the holding mechanism overlaps or nearly overlaps with the position of the passage of the female mold, by realizing overlap of paths of rotary moving of the holding mechanism (more specifically the holding part of the drop) and that of the molding die and making the movement of the holding mechanism follow that of the molding die (or, by making the movement of the molding die follow that of the holding mechanism, vice versa) as mentioned above. This novel technique can realize insertion of the drop completely accurately and rapidly by a simple means, while preventing the drop from displacement from the required position in the female concave and drop even when the difference between the maximum external diameter of the drop and the inner diameter of the female concave is smaller or even when the moving rate of drop-holding mechanism is raised more. Further, the drop can be inserted completely or almost completely accurately even when the molding cycle is performed much faster by raising the rotation rate of the rotary-type compression molding machine in order to increase production efficiency.

Still further specifically, the present inventors also created the related inventions cited below, by using various techniques as follows: setting auxiliary means for moving such as extension and contraction of radius of rotation of the holding mechanism or setting means for the holding mechanism, and oscillation of the holding mechanism so that the rotation path of the holding mechanism overlaps or nearly overlaps with that of the molding die; providing a control means thereof; making the rotary-moving type holding mechanism move on the path of an eccentric circle whose center is different from that of the circular path; and controlling the path by a controlling guide etc.

The process of creating the present invention, and the basic configuration and feature of the present invention are schematically described as above. Here, when the present invention is overviewed, the present invention consists of a following group of units of the inventions, wherein the inventions [1] to [4] are basic inventions, while other inventions give shape and embodiment to [1] to [4]. Meanwhile, "the present invention" refers to the group of inventions [1] to [19] as a whole.

[1] A method for forcibly inserting a drop of a molding material into a concave of a molding female die in a compression molding machine, wherein a molten synthetic resin extruded from an extrusion opening formed at the edge of an extrusion die head is formed into a determined quantity of the drop by holding and then cutting or cutting and then holding by a holding mechanism and a cutter placed at a synthetic resin accepting position which opposes to the extrusion die head, the drop is held and conveyed by the holding mechanism, and the drop held at a discharging position on a molding female die is forcibly inserted and supplied into the concave of the molding female die while the holding is released.

[2] A method for continuously supplying a drop of a molding material into a moving molding die in a compression molding machine which is a method for supplying the drop in a molding die follow-up manner, wherein a holding mechanism of the drop on a rotary- and movable type drop supply is made to approach the rotating molding die and the rotation path of the holding mechanism is made to overlap or nearly overlap with that of the molding die within a determined area and the movement of the holding mechanism is made to follow that of the molding die or the movement of the molding die is made to follow that of the holding mechanism, and the holding of the drop held and conveyed by the holding mechanism is released on the overlapped or nearly overlapped rotary path, to insert the drop into the concave of the ding female die for supply.

[3] A device for forcibly inserting a drop of a molding material into a concave of a molding female die in a compression molding machine, which comprises following means: an extruding means for extruding a synthetic resin molding material which forms it into soften and molten condition by heating plasticization and extruding it, an extrusion opening formed at the edge of an extrusion die head attached to the extruding means, a holding mechanism formed at a synthetic resin accepting position opposing to the extrusion die head, for holding the molten synthetic resin extruded from the extrusion opening, a cutter for cutting the synthetic resin into a determined quantity of the drop, and a supplying means for conveying the drop into a discharging position provided on the molding female die and the held drop is forcibly inserted into the concave of the molding female die with releasing the holding.

[4] A device for continuously supplying a drop of a molding material into a moving molding die in a compression molding machine which is a device for supplying a drop in molding die follow-up manner, wherein a holding mechanism on a rotary- and movable type drop supply is made to approach the rotating molding die and the rotation path of the holding mechanism is made to overlap or nearly overlap with that of the molding die within a determined area and the movement of the holding mechanism is made to follow that of the molding die, or the movement of the molding die is made to follow that of the holding mechanism, and the holding of the drop held and conveyed by the holding mechanism is released on the overlapped or nearly overlapped paths of rotation, to insert and supply the drop into the concave of the molding female die.

[5] The method or device for supplying a drop in mold follow-up manner according to [2] or [4], wherein the drop held on the discharging position provided on the female mold is supplied by forcibly inserted into the concave of the female mold with releasing the holding, when the holding of the drop held and conveyed by the holding mechanism is released on the overlapped or nearly overlapped paths of rotation, to insert and supply the drop into the concave of the molding female die.

[6] The method or device for inserting or continuously supplying a drop into a concave of a female mold according to any of [1] to [5], wherein the rotary- and movable type drop supply having plurality of holding mechanisms is used and the compression molding machine is a rotary compression molding machine which uses rotary-type having plurality of dies consisting of male and female molding dies.

[7] The method or device for forcibly inserting a drop into a concave of a female mold according to any of [1], [3], [5] or [6], wherein the method for forcibly inserting a drop into the concave of the female mold is a forcible method for dropping in which the holding mechanism to hold the drop is lowered at accelerating speed or at a constant speed by inertia.

[8] The method or device for forcibly inserting a drop into a concave of a female mold according to [7], wherein a lift block is provided for lowering the holding mechanism to hold the drop at accelerating speed or at a constant speed by inertia.

[9] The method or device for supplying a drop in molding die follow-up manner according to any one of [2], and [4] to [8], wherein the rotation path of the movable-type molding die is a circular path and the holding mechanism on the movable-type drop supply in molding die follow-up manner can move elastically or perform rotation within a radius of rotation which elastically moves.

[10] The method or device for supplying a drop in molding die follow-up manner according to any one of [2] and [4] to [9], wherein the holding mechanism on the rotary- and movable type drop supply is made to approach the rotating molding die, while the holding mechanism is made to tilt at a specific angle to the normal of the rotary- and movable type drop supply so that the rotation path of the holding mechanism is made to overlap or nearly overlap with that of the molding die within a determined area.

[11] The method or device for supplying a drop in molding die follow-up manner according to any one of [2] and [4] to [10], wherein the holding mechanism on the rotary- and movable type drop supply is made to approach the rotating molding die when it rotates, while the holding mechanism is moving along a guide by a cam provided outside the rotary- and movable type drop supply and a cam follower integrated with the holding mechanism, the rotation path of the holding mechanism is made to overlap or nearly overlap with that of the molding die within a determined area so that the movement of the holding mechanism is made to follow that of the molding die or the movement of the molding die is made to follow that of the holding mechanism.

[12] The method or device for supplying a drop in molding die follow-up manner according to [11], wherein the holding mechanism further follows the position of the molding die by oscillation when the holding mechanism is made to approach the rotating molding die.

[13] The method or device for supplying a drop in molding die follow-up manner according to [11] or [12], wherein the holding mechanism is supported by a support, the support is biased or held on with being applied force toward the exterior of a wheel on which the holding mechanism is attached, the cam follower abutting on the cam is set so that the holding mechanism does not move outward from the position, the support moves inward and outward along the guide whose angle varying so that the angle can be set at a specific angle toward the normal or curve of the cam or the angle is optimal, while the support moves along the guide, the holding mechanism abuts the die as appropriate and approaches the rotating molding die to make the path of the holding mechanism overlap or nearly overlap with that of the molding die within a determined area and make the movement of the holding mechanism follow that of the molding die or make the movement of the molding die follow that of the holding mechanism.

[14] The method or device for supplying a drop in molding die follow-up manner according to any one of [2] and [4] to [8], wherein the rotary- and movable type holding mechanism is supported by a fixing member moved on the path around the eccentric circle, a moving path of the fixing member is controlled by a controlling guide provided on the path of the fixing member or the cam within a determined area in which the fixing member approaches the rotating molding die to make the path of the holding mechanism overlap or nearly overlap with that of the molding die and make the movement of the holding mechanism follow that of the molding die or make the movement of the molding die follow that of the holding mechanism.

[15] The method or device for supplying a drop in molding die follow-up manner according to [14], wherein the rotary- and movable type holding mechanism is supported by an extension means provided on a media in a wrapping driving device, the path of the holding mechanism overlaps or nearly overlaps with that of the molding die in a range of concentric circular path of a concentric circle by making comprise at least the circular path of concentric circle with the same as the circular path traced by the movable molding die.

[16] The method or device for supplying a drop in molding die follow-up manner according to [15], wherein the holding mechanism is supported by the support, the support is applied force toward the exterior of the wheel on which the holding mechanism is attached, the cam follower abutting on the cam is set so that the holding mechanism does not move outward from the position, the support moves inward and outward along the guide, while the support approaches the rotating molding die to make the rotation path of the holding mechanism overlap or nearly overlap with that of the molding die within a determined area and make the movement of the holding mechanism follow that of the molding die.

[17] The method or device for supplying a drop in molding die follow-up manner according to any one of [14] to [16], wherein the path around the eccentric circle is a path formed by vertical or horizontal rotation.

[18] The method or device for supplying a drop in molding die follow-up manner according to any one of [2] and [4] to [17], wherein control is performed to adjust the moving rate of the holding mechanism to that of the molding die when the moving path of the holding mechanism overlaps with the rotation path of the rotating molding die.

[19] The method or device for supplying a drop into a molding die according to any one of [1] to [18], wherein the molding which is molded in the compression molding machine is a preform.

BRIEF DESCRIPTION OF THE DRAWINGS

FIGS. 5A to 5F are schematic views which consist of six animated images dynamically illustrating an example of mechanisms in the present invention which make the rotation path of the holding mechanism overlap with that of the molding die.

BEST MODE OF CARRYING OUT THE INVENTION

The preferred embodiments of the present invention are specifically described in detail referring to each of the drawings presenting prototypes of the embodiments.

(1) Molding System of the Present Invention

The method and device of the molding system of the present invention wherein drops are accurately, rapidly, and continuously supplied and inserted into female molds of a compression molding machine, and it is preferably used for molding preforms for manufacturing containers by blow molding following compression molding or the like.

The basic system of the present invention is a method or device for forcibly inserting drops of a molding material into concaves of molding female dies in a compression molding machine, wherein molten synthetic resin extruded from an extrusion opening formed at the edge of an extrusion die head is formed into a determined quantity of drops by holding and then cutting or cutting and then holding by a holding mechanism and a cutting member placed at a synthetic resin accepting position which opposes the extrusion die head, the drops are held and conveyed by the holding mechanism, and the drops held at a discharging position on the molding female dies are forcibly inserted and supplied into the concaves of the molding female dies while the holding is released.

Here, the term "to hold" includes not only to pinch by the holding mechanism but also drop-prevention ability caused by friction of the drop and the holding part of the holding mechanism, and the drop-prevention ability works more effectively by centrifugal force generated by high-speed rotation of the rotary with the holding mechanism.

In addition, the term "forcibly" comprises: a technique for giving the initial speed to the drop forcibly, a technique for assisting the slip of the drops by oscillating the holding mechanism in order to assist the drop of the drops against the friction of the holding part of the holding mechanism, and a technique for releasing the centrifugal force by shifting the path of the uniform circular motion by the holding mechanism from the circle in order to assist the drop of the drops.

As techniques for giving the initial speed to the drop forcibly: acceleration of drop by lowering the holding mechanism at accelerating speed, and movement at a constant speed using inertia or the like by lowering the holding mechanism at a constant speed can be exemplified.

Figure 1:
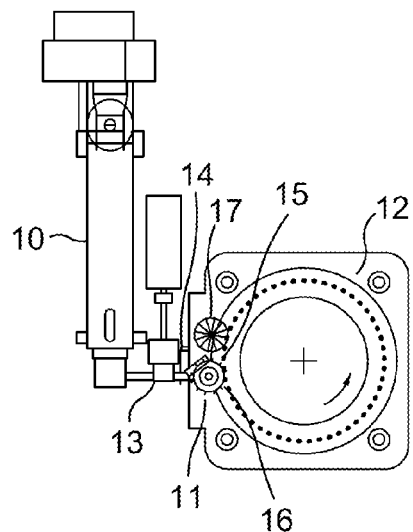
FIG. 1 is a schematic plain view which specifically illustrates a preferred embodiment of the molding system which is configured according to the present invention.

FIG. 1 is a schematic plain view which specifically exemplifies the constitution and operation of the whole invention in the present invention, that is, a preferred embodiment of the molding system for preforms constituted according to the present invention (which is applied as a preliminary molding system for blow molding of synthetic resin containers), and illustrating each of the components (constituting devices)

concerning the whole system for supplying and inserting drops into plurality of molds (preferably a number of molds) in the compression molding machine in the present invention.

A preferable rotary system in which production efficiency is high is applied as the molding system in the present figure, wherein the main components consists of an extruder 10, a rotary- and movable type drop supply 11, and a rotary-type compression molding machine (rotatingly moving) 12. The extruder 10 comprises an extrusion die head 13, and an extrusion opening 14, a rotary- and movable type drop supply 11 comprises a number of holding mechanisms 15 of drops which are disposed about the periphery of the rotary- and movable type drop supply 11 at regular intervals, and the rotary-type compression molding machine comprises a number of molding dies 16 which are disposed about the periphery of the rotary-type compression molding machine at regular intervals. A discharging machine 17 discharges the molded preforms, and makes molding complete.

Figure 2:
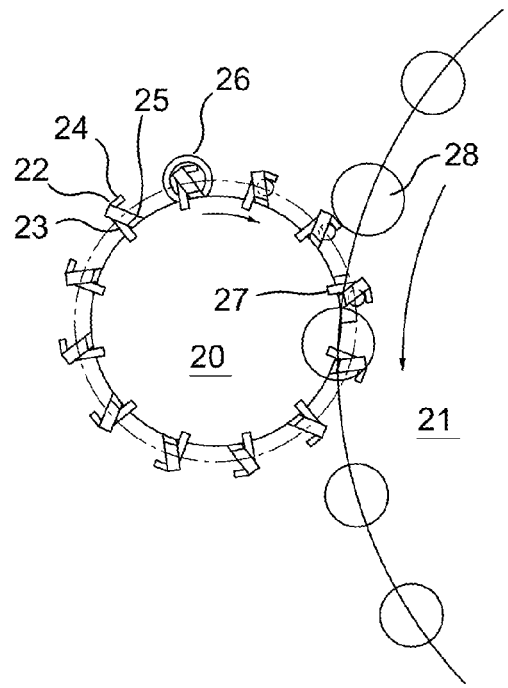
FIG. 2 is a schematic plain view in which the molding system in the present invention is partially enlarged.

FIG. 2 is a schematic plain view wherein a part of the molding system shown in the above FIG. 1 is enlarged, and the configuration of a rotary- and movable type drop supply 20 and a rotary-type compression molding machine (rotatingly moving) 21 is enlarged and illustrated, and the overlap of the rotation paths thereof are shown, and the condition in which the rotation path of the rotary- and movable type drop supply 20 having a number of holding mechanisms 22 overlaps with that of the rotary molding dies having a number of molds 28 in the rotary-type compression molding machine 21 and the drop is made to drop in the overlapped paths.

The rotary- and movable type drop supply 20 comprises a number of holding mechanisms 22 which are disposed about the periphery of the rotary- and movable type drop supply at regular intervals in the circumferential direction, the holding mechanisms consist of holders 24 and pushers 25, and each of the holding mechanisms 22 is attached with a cutter 23 for cutting the molten resin by a determined quantity.

Molten resin fed from the extrusion opening is cut by a determined quantity by the cutter 23 at a molten resin accepting position 26, the holding mechanisms 22 accepts the molten resin in lumpy condition (drop), and the drop is pinched to hold by the holders 24 and the pushers 25, and the holding mechanisms 22 holding the drop is transferred with rotation.

A drop point 27 to drop the drop is set on the path in which the rotation path of the rotary- and movable type drop supply 20 overlaps with that of the rotary-type compression molding 21 in the position, the pusher 25 releases the holding of the drop by retracting, and preferably the drop is forcibly dropped and inserted into a female concave (a cavity) in the molding die 28.

The holding mechanism is also designed that it will follow and overlap with the position of molding die, for instance by designing the holding mechanism to move with suitable extension and rotation and follow the molding die more accurately.

(2) Drop Forming and the Holding Mechanism Therefore, and Supply of Drops into Female Molds In FIG. 1, the heated and molten molding material of synthetic resin is discharged from the body of the extruder 10 by the extruder 10, and the synthetic resin in molten condition is delivered and fed to the resin passage of the extrusion die head 13 via a gear pump and extruded from the extrusion opening 14. The thermoplastic synthetic resin in molten condition as typified by polyethylene terephthalate which is extruded from the extrusion opening 14 is cut by the cutter attached to the holding mechanism and separated from the extrusion opening 14 to become drops of molten lump, and the drops are held by a number of holding mechanisms 15 with being pinched by the holders and the pushers of the holding mechanisms 15 provided on the rotary- and movable type drop supply 11 at the synthetic resin accepting position opposing to the extrusion die head.

The drops are delivered and transferred toward the upper part of the concaves of the female molds with being held, the holding is released there and the drops are dropped, preferably the drops are forcibly dropped by being applied infall velocity or the like, and the drops are supplied and inserted into the concaves of the female molds continuously and accurately at a number of the molding dies 16 provided in the rotary-type compression molding machine 12.

As mentioned above according to FIG. 2, one of the holding mechanism consists of the holder and the movable pusher disposed as they opposed to the holder, the molten resin is held by being pressed to the holder by forward motion of the pusher, and the molten resin is delivered to the discharging position, the drop which is held at the discharging position on the female mold is dropped, preferable the drop is dropped forcibly, while the holding is released by backward motion of pusher, and the drop is inserted and supplied into the molding female concave.

The holding mechanism of the drop is moved toward the drop discharging position opposing to the female mold from the synthetic resin accepting position opposing to the extrusion die head, and the female mold is delivered to the discharging position by their move making to synchronize with the movement of the holding mechanism.

Figure 3:
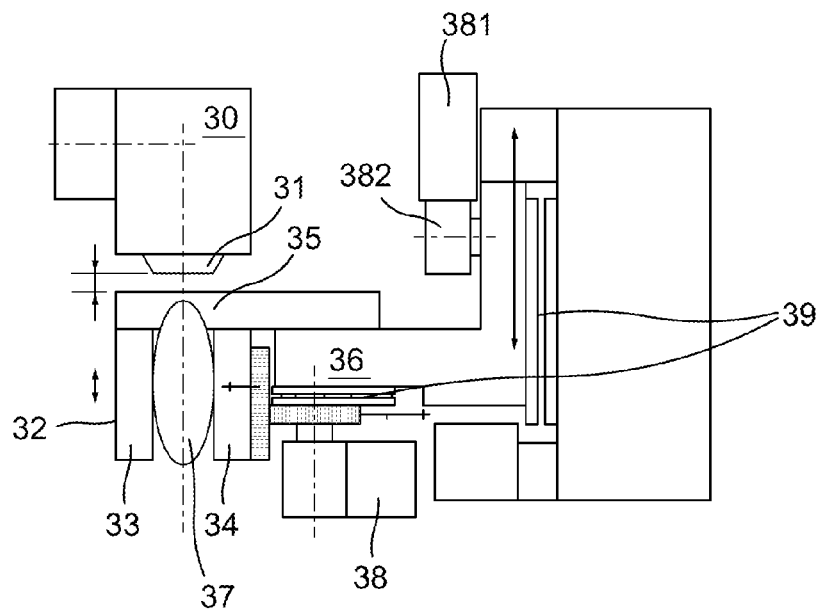
FIG. 3 is a schematic front view which illustrates the structural segment in the present invention in which drop is held, cut and dropped.

FIG. 3 is a schematic front view which specifically illustrates a preferable embodiment in the structural segment where drop is held, cut, and forcibly dropped and the action thereof, concerning the holding mechanism of the drop.

A holding mechanism 32 consisting of a holder 33 and a pusher 34 is positioned opposing to an extrusion opening 31 of a die head 30 of an extruder, and a cutter 35 is attached to the holding mechanism 32, and the holding mechanism 32 is fixed to a lift block 36. The back and forward motion of the pusher 34 is generated by drive of a back-and-forth moving cam 38. 39 shows a linear guide, and the lift block 36 moves up and down following a cam follower 382 which moves along a up-and-down moving cam 381.

The molten resin extruded from the extrusion opening 31 of the die head 30 of the extruder is cut by a determined quantity to become a drop 37 by the cutter 35 which is horizontally placed on the upper part of the holding mechanism 32, and the drop 37 is pinched and held by the holder 33 and the pusher 34 of the holding mechanism 32 on or about cutting, delivered to the female molds, forcibly dropped by the backward motion of the pusher 34 caused by retracting the back-and-forth moving cam 38 at the drop position of the drop while the holding of the drop is released, and supplied into the concaves of female molds.

For the purpose of causing forcible drop, the technique can be adopted, in which the drop is dropped at accelerating speed or at a constant speed with the use of acceleration or law of inertia by lowering the holding mechanism suddenly or at a constant speed, when the holding of the drop by the holing mechanism is released to drop the drop.

Figure 10:
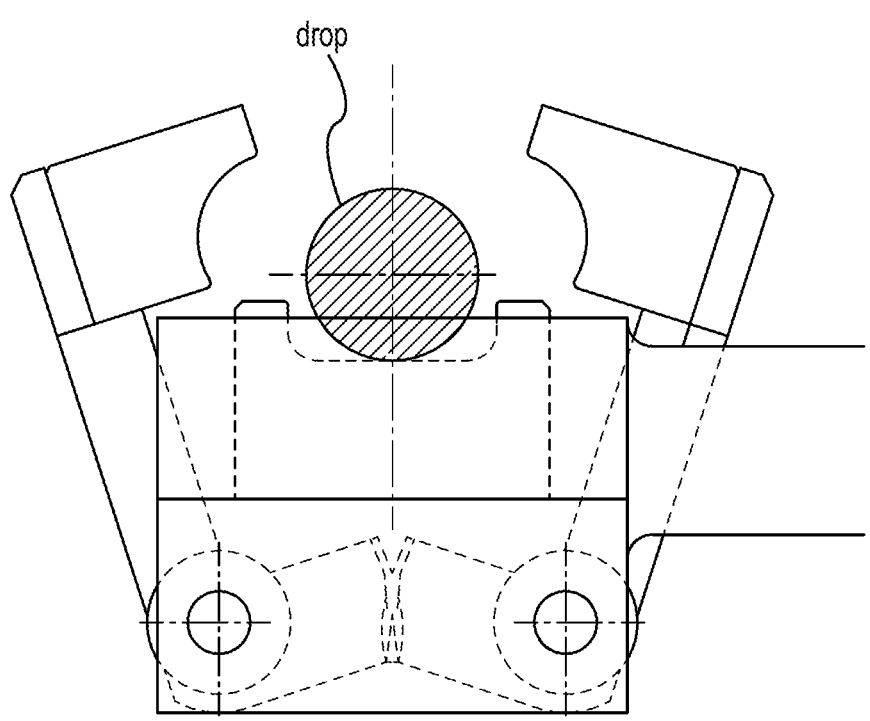
FIG. 10 is a schematic plain view which illustrates an openable and closable holding mechanism which is an example of the embodiment of the holding mechanism in the present invention.

Further, the mechanism of the holder may take the mode wherein the drop is wrapped around by fingers from both sides as illustrated in FIG. 10.

Meanwhile it is preferable that the inside diameter of the fingers are equal to or larger than the outside diameter of the drop, because it prevents squash of the drop by pinching at that time. Here, the drop is contacted the fingers by centrifugal force generated from the rotation of the rotary comprising the fingers, and the drop is prevented from dropping by contact friction with the fingers and held. Meanwhile, considering influence of damage and distortion on the drop, which is formed by local contact of the fingers and the drop, it is preferable to assure the large contact area by adjusting the shape of the fingers to that of the drop. For instance, when the drop is in shape of column, the fingers may be made to take the shape of column which is the same size as or slightly larger than the drop.

In addition, in order to release the holding by centrifugal force, it may be designed that the drop slips easily by oscillating the finger and changing static friction force acting between the drop and the fingers to dynamic friction force to facilitate dropping the drop, or it may be designed that the centrifugal force is reduced in order to drop the drop by changing the centrifugal force when following up molds, which is caused by the introduction of the drop supply system in mold follow-up manner to be described. Further, the holding may be released forcibly by forcibly lowering the holding mechanism.

Meanwhile, as after-mentioned and as illustrated in FIG. 5-A as a preferred embodiment, a cam follower 54 is attached to the holding mechanism 32 provided on the rotary- and movable type drop supply, rotates along a cam 55 provided on the rotary- and movable type drop supply, a holding mechanism 52 is guided by a guide 53 and displaced according to the inner peripheral side of the cam, and the rotation path 56 of the holding mechanism is made to overlap with that of a molding die 51 in a determined contiguous range.

As for the means for dropping and inserting the drop, forcible drop instead of natural fall forcibly sets the direction to drop, and allows the insertion of the drop into the female mold more accurately and rapidly. This means is to be the first basic constituent of the present invention.

As for the specific means for forcible drop, a technique to knock off the drop by a rod or the like is thought of, but the additional mechanism may be complicated and may cost high then, therefore the technique to drop the drop at accelerating speed or at a constant speed by lowering the position of the holding mechanism suddenly or at a constant speed with the use of acceleration or law of inertia, when the holding mechanism of the drop is released to drop the drop, is preferable. This technique only requires attachment of a driven-type lift for the holding mechanism, so the additional installation is simple and at low cost.

This new and additional technique allows the drop insertion more accurately and rapidly, without dropping out of the determined position of female concave by displacement, even when the difference between the maximum diameter of the drop and the inner diameter of the female concave is smaller, or even when the moving rate of the holding mechanism of the drop accelerates. Further, it can prevent the lump (the drop) of molding material of synthetic resin in molten condition extruded from the extrusion die head from being difficult to drop by adhering to the holding mechanism due to its viscosity, therefore a part of the drop does not adhere to and accumulate in the holder as stickcum because the drop drops smoothly, or production efficiency can be risen by shorting the molding cycle by raising the rotation rate of the rotary-type compression molding machine.

In the conventional method for free fall, it was required to stop the molding machine to clean some parts such as the holding mechanism regularly, due to viscosity of the molten resin of itself in the drop or due to adhesion and accumulation at the position of contact of the holding mechanism by viscous components and oligomer contained in the molten resin, which results in deterioration of drop slippage causing defective dropping. In the present invention, on the other hand, the frequency of necessity of cleaning parts accompanied by stopping operation of the molding machine can be largely reduced.

Further, in the present invention, the holding of the drop is released by retracting the pusher of the holding mechanism when the drop is forcibly dropped, therefore, drop can be performed smoothly by generated action of tearing the drop, which is dropping downward, from the holder and pusher of the holding mechanism.

(3) A Molding Die and Compression Molding

As for the drop supplying part and the compression molding machine, a rotary- and movable type drop supply having plurality of (preferably a number of) holding mechanisms and a rotary type having plurality of (preferably a number of) molds in the rotary-type compression molding machine, are adopted for increasing production efficiency.

The molding die consists of a female mold having a cavity and a male mold having a core. After the drop is supplied and inserted into the concave of the female mold, the drop is then applied pressure for press holding by lowering the male mold or lifting the female mold and the drop is molded into the required molding, e.g., a preform (a parison), under suitable temperature and pressure for molding.

In the molding cycle, a drop is sequentially held, cut, and dropped in other rotating holding mechanism; the drop is sequentially accepted by other mold in the rotary-type, and the female mold is lifted (or male mold is lowered) and, molding is performed with applying pressure for press holding sequentially in cooperation with the core of the male mold, the molding is discharged from the discharger, and thus the molding preform or the like is completed.

(4) A System for Supplying a Drop in Mold Follow-Up Manner

A system for supplying a drop in mold follow-up manner in the present invention is a system for supplying a drop in molding die follow-up manner for continuously supplying the drop into the movable molding die, wherein the holding mechanism of the drop on the rotary- and movable type drop supply is made to approach the rotating molding die and the rotation path of the holding mechanism is made to overlap or nearly overlap with that of the molding die within a determined area so that the movement of the holding mechanism is made to follow that of the molding die, or the movement of the molding die is made to follow that of the holding mechanism, and the holding of the drop held and conveyed by the holding mechanism is released on the overlapped or nearly overlapped rotation path to insert and supply the drop into the concave of the molding female die, in a method and device for continuously supplying a drop of the molding compound into a movable molding die in a compression molding machine.

That is, the specific technique is to be the second characteristic basic constituent of the present invention, wherein the drop point of the drop is made to overlap or nearly overlap with the position of the passage of mold by releasing the drop holding of the holding mechanism, by realizing overlap of paths of rotary moving of a number of holding mechanisms (the drop holding part) on the rotary- and movable type drop supply and that of a number of molding dies (female) on the rotary-movable type in the rotary-type compression molding machine, by making the rotation path of the holding mechanism overlap with that of the molds, and by making the movement of the holding mechanism follow that of the molding dies (or contrarily, by making the movement of the molding dies follow that of the holding mechanism) on the overlapped paths.

In this technique, while drop is dropped by releasing drop holding of the holding mechanism can realize the drop insertion completely or almost completely accurately at the time point when the position of the holding mechanism overlaps with that of the mold during the time when the rotation path of the holding mechanism overlaps with that of the female mold by making the movement of the holding mechanism follow that of the molding die, even if time lag may occur for the holding mechanism or the mold to arrive at the determined position on the rotation path of the holding mechanism overlapping with that of the mold; and further the drop may be dropped and inserted during the time when the position of the holding mechanism overlaps with that of the female mold, when the drop is dropped and inserted into the female concave on the overlapped paths, which generates a windowtime. Therefore, accuracy of insertion of the drop is ensured complementarily from this point. Still further, the movement of the holding mechanism can also be made to follow that of the molding die, (or contrarily, the movement of the molding die can also be made to follow that of the holding mechanism), by controlling the moving rate of the holding mechanism and that of molding die.

This novel technique can realize insertion of the drop completely or almost completely accurately and rapidly by a simple means, which is more effective when this novel technique is used in combination, with the method for dropping forcibly, without the drop being displaced from the required position in the female concave and dropped, even when the difference between the maximum external diameter of the drop and the inner diameter of the female concave is much smaller than usual or even when the moving rate of drop holding mechanism is considerably raised than usual. Further, drop insertion can also be performed completely or almost completely accurately when the molding cycle is performed much faster e.g. by raising the rotation rate of the rotary-type compression molding machines in order to increase production efficiency.

As for the specific means for making the rotation path of the holding mechanism (the drop holding part) on the rotary- and movable type drop supply overlap with that of the molding die (female) on the rotary type in the rotary-type compression molding machine, the technique as follows is used for a typical example: the holding mechanism may be made to approach the rotating molding die, while the holding mechanism may be made to tilt at a determined angle to the normal of the rotary- and movable type drop supply so that the rotation path of the holding mechanism is made to overlap with that of the molding die in a determined contiguous range. As a result of design of the device and consideration by experiment, it was revealed that setting the determined angle as 0 to 20 degree to the normal can nearly overlap the rotation paths in the longest zone.

Here, to nearly overlap refers to that the distance between the position of the central axis of the cylindrical drop and that of the cylinder of a bottomed cylindrical mold is preferably 2 mm or less, when the drop is held in the holding mechanism.

Figure 4:
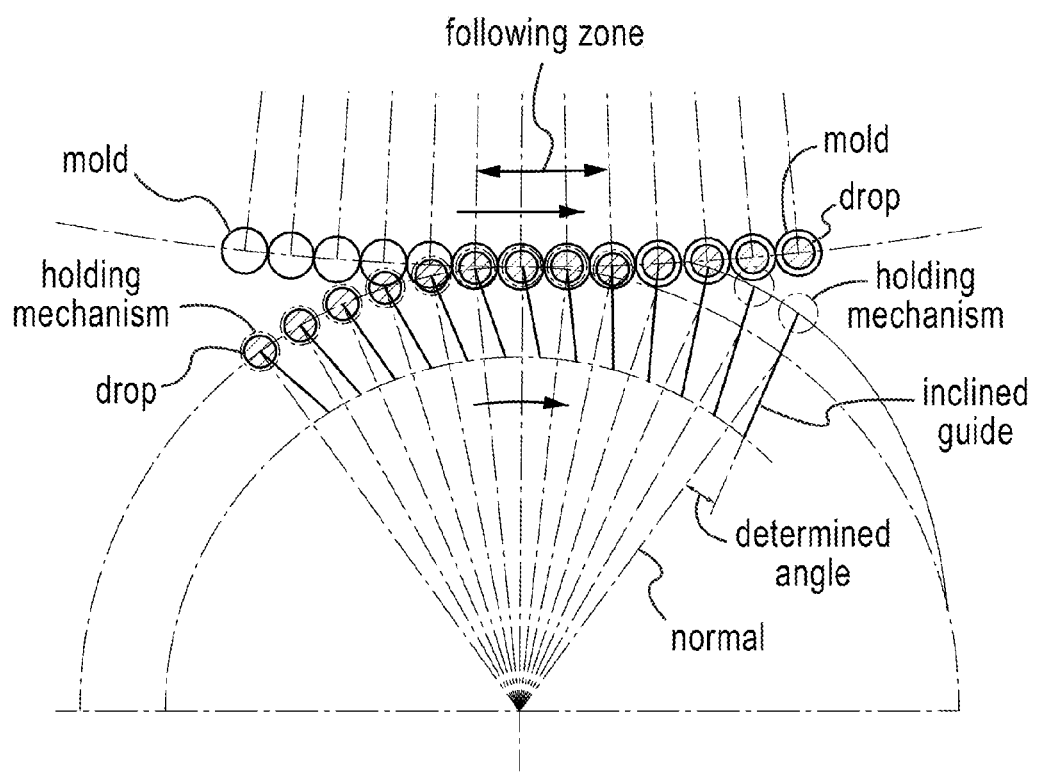
FIG. 4 is a schematic plain view which geometrically illustrates the overlap of the rotation path of the holding mechanism with that of the molding die in the present invention.

The condition where the rotation paths are overlapped is geometrically illustrated in a schematic plain view of FIG. 4, and the rotary moving path of the holding mechanism nearly overlaps with that of the molding die, as schematically illustrated that the holding mechanism and the mold are moved sequentially in a determined and illustrated range.

The movement of the holding mechanism is made to follow that of the molding die (or contrarily, the movement of the molding die is made to follow that of the holding mechanism) on the overlapped rotation path by controlling moving rate or the like, and the holding mechanism is made to operate to insert and supply the drop held and conveyed into the concave of the molding die by releasing holding, at the point (at following zone in the figure) in which the position of the holding mechanism (the drop holding part) overlaps with that of the molding die (female).

Meanwhile, in relation to FIG. 4, following methods for following the mold by the holding mechanism can be adopted: a method for following the mold by the holding mechanism which has an embodiment in which the central axis of rotation of the holding mechanism is disposed on the same axis as the circular path traced by the movable molding die, or further a method for following the mold by the holding mechanism which has an embodiment in which the central axis of rotation of the holding mechanism is disposed on an optional position on the circular path traced by the movable molding die.

(5) Follow of the Movement of the Holding Mechanism after that of the Molding Die In order to make the position of mold overlap with that of the holding mechanism by making the rotation of the holding mechanism follow that of molding die for releasing drop holding of the holding mechanism to insert and supply the drop into female mold, embodiments as follows are adopted: an embodiment (a means) wherein the rotation path of the holding mechanism overlaps with that of mold, the movement of the holding mechanism is made to follow that of the molding die on the overlapped paths, and the point in which the position of the holding mechanism overlaps with that of the mold is selected, or an embodiment for making the moving rate of the holding mechanism overlap with that of the mold on the part of the path on which the rotation path of the holding mechanism overlaps with that of the mold, and further an embodiment for making the position of the holding mechanism overlap with that of the molds by controlling moving rate of the holding mechanism on the overlapped path. (Meanwhile, contrarily, the same is true in the case the movement of the molding die is made to follow that of the holding mechanism).

(6) A Mechanism for Nearly Overlapping the Rotation Path of the Holding Mechanism with that of Molding Die A typical mechanism (a mode for action) for making the rotation path of the holding mechanism overlap or nearly overlap with that of mold in a determined contiguous range by making the holding mechanism approach the rotating mold while the holding mechanism is made to tilt at determined angle to the normal in the rotary- and movable type drop supply, so that the rotation path of the holding mechanism is made to overlap with that of the mold, is basically a mechanism, in which the holding mechanism on the rotary- and movable type drop supply rotates and is made to move along the guide by the cam provided and fixed to the exterior of the rotary- and movable type drop supply and the cam follower integrated with the holding mechanism, and the holding mechanism is made to approach the rotating molding die, the rotation path of the holding mechanism is made to overlap or nearly overlap with that of the molding die within a determined area so that the movement of the holding mechanism is made to follow that of the molding die or the movement of the molding die is made to follow that of the holding mechanism.

As to a major example of the mechanism, it is operated by following action: the cam follower attached to the holding mechanism rotates around the cam (preferably the all around cam), the holding mechanism is guided by the guide (the guide for transmitting cyclic displacement which is integrated into the holding mechanism so that the guide can slide and is positioned with being tilted at a determined angle to the normal in the rotary- and movable type drop supply) and displaced according to the inner peripheral side of the cam, the displacement makes the holding mechanism approach the rotating molding die with the holding mechanism is made to tilt at a determined angle to the normal in the rotary- and movable type drop supply, and the rotation path of the holding mechanism is made to overlap with that of the molding die in a determined contiguous range so that the movement of the holding mechanism is made to follow that of the molding die almost completely.

Figures showing displacement for helping understanding the mechanism as a major example in which the rotation path of the holding mechanism nearly overlaps with that of the molding die as mentioned above, are shown in FIGS. 5-A to 5-F as a series of animated images consisting of six images.

In FIG. 5-A, 50 is a support of the holding mechanism 52, 51 is a molding die, and 53 is a guide (a linear slide) integrated into the support 50 of the holding mechanism 52, the support 50 of the holding mechanism 52 is made to move at a determined angle to the normal, 54 is a cam follower attached to the support 50, the support 50 is made to move along the guide 53 according to the curve of the inner peripheral side of a cam 55, 55 is an all around cam provided on the rotary- and movable type drop supply so that the drop held by the holding mechanism 52 is made to follow the mold 51, and 56 shows the overlapped range of rotation paths of the holding mechanism and the molding die which overlap within a determined area. The curve of the inner peripheral side of the cam 55 is designed so that the drop held by the holding mechanism follows the mold 51.

Figure 6:
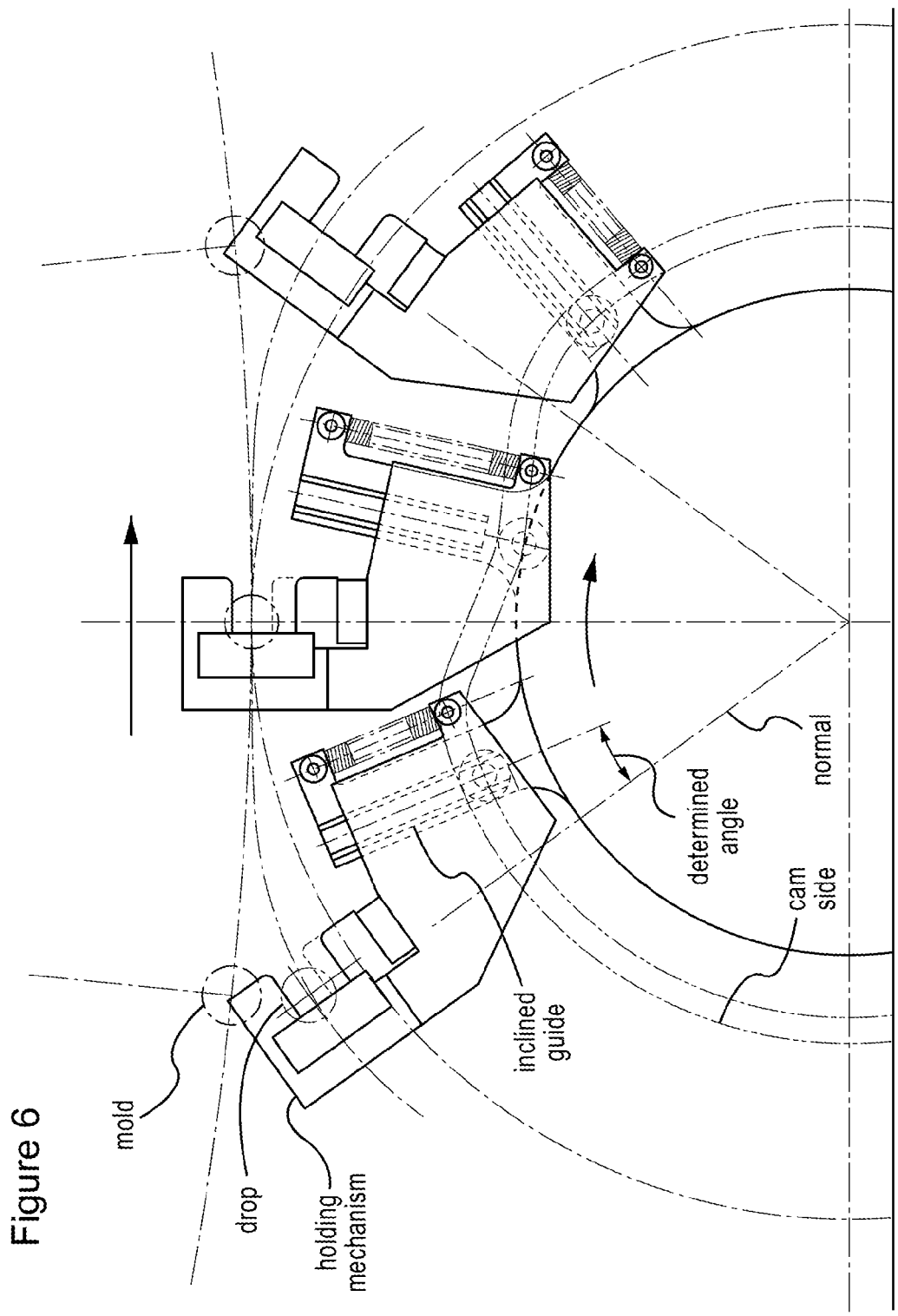
FIG. 6 is a schematic plain view which illustrates the configuration of a tension mechanism using a tension spring in the present invention.

Meanwhile, it is preferable that the support 50 is tensed by tension springs which are not shown, toward the exterior of the wheel on which plurality of holding mechanisms 52 are attached, and the cam follower 54 is set to abut on the inner peripheral side of the cam 55 so that the holding mechanism does not move outward from the position. The support 50 moves inward and outward along the guide 53 set at a determined angle to the curve and the normal of the cam 55. The configuration of a tension mechanism by the tension springs is illustrated in FIG. 6. Further, an embodiment in which the holding mechanism abuts on the mold according to need to ensure overlap of these positions in FIG. 6 etc. can be also selected.

To dynamically explain the mechanism which makes the rotation path of the holding mechanism overlap with that of the molding die, according to FIGS. 5-A to 5-F, in FIG. 5-A, the holding mechanism 52 comprises a drop holding part shown in a circle, the guide 53 integrated into the support 50 of the holding mechanism 52 and the cam follower 54 attached to the support 50 rotate around the cam while the drop is held in the drop holding part, the support 50 is displaced according to the inner peripheral side of the cam, and the holding mechanism 52 rotates and moves clockwise from the left side in the figure. Then, the holding mechanism is made to approach the rotary moving mold 51, while the holding mechanism 52 is tilted at a determined angle toward the normal in the rotary- and movable type drop supply.

In the meantime, the molding die 51 is also approaching the holding mechanism 52, and is rotary moving anti-clock wise from left side in the figure. The rotation paths of the holding mechanisms 52 and the molding die 51 are shown in white-dotted line, respectively.

In FIG. 5-B, the drop holding part of the holding mechanism 52 approaches quite closely to the molding die 51, in FIG. 5-C, the position of the drop holding part of the holding mechanism 52 overlaps with that of the molding die 51, simultaneously, the cam follower 54 attached to the support 50 is greatly displaced to displace the support 50 in the direction of the center of the circle of the rotary- and movable type drop supply, which causes the displacement of the holding mechanism 52 in the same direction, and the rotation path of the holding mechanism 52 is made to overlap with that of the molding die 51, as illustrated in FIG. 5-D.

From the point of FIG. 5-D to the point of 5-E, the rotation path of the holding mechanism 52 (the drop holding part) is made to overlap with that of the molding die 51. In this zone where the rotation paths are overlapped, the position of the holding mechanism 52 (the drop holding part) and that of the molding die 51 are nearly overlapped, and the drop is dropped at the time point by releasing the drop holding of the holding mechanism 52, allowing accurate insertion of the drop into the female concave of the molding die 51.

In this technique, dropping the drops by releasing the drop holding of the holding mechanism 52 can realize drop insertion almost completely at the time point when the position of the holding mechanism 52 overlaps with that of the mold 51 during the time when the rotation path of the holding mechanism 52 overlaps with that of the mold 51 by making the movement of the holding mechanism 52 follow that of the mold 51, even if there is a difference between the position of the holding mechanism 52 and that of the mold 51 on the overlapped rotation path of the holding mechanism 52 and the mold 51; and when the drop is dropped and inserted into the female concave on the overlapped paths, it may be inserted within the time when the paths are overlapped, which generates windowtime. Therefore, it is understood that accuracy of drop insertion is ensured complementarily from this point. Meanwhile, it can be said that the windowtime generated by the overlapped paths is important, also from the point that it requires a certain length of time from the time when the drop pinching is made to release to the time when the drop starts dropping actually and inserts into the concave of the female mold.

When the holding mechanism and the mold advance to the point as shown in FIG. 5-F, the cam follower 54 attached to the support is not displaced any more, the guide 53 is not displaced in the direction of the center of the circle of the rotary- and movable type drop supply any more, thereby the holding mechanism 52 is not displaced in the same direction any longer, and the rotation path of the holding mechanism 52 moves away from that of the molding die 51 as illustrated.

(7) Other Embodiments to Make the Rotation Path of the Holding Mechanism Overlap or Nearly Overlap with that of the Molding Die 7-1. Utilization of Oscillation Followings are examples of the application example of embodiments for utilizing oscillation in addition to the mechanism of the major example in which the rotation path of the holding mechanism is made to overlap with that of the molding die as mentioned above, and methods and devices wherein the position of the holding mechanism is made to overlap with that of the molding die more accurately by adding oscillating motion to the holding mechanism.

Figure 7:
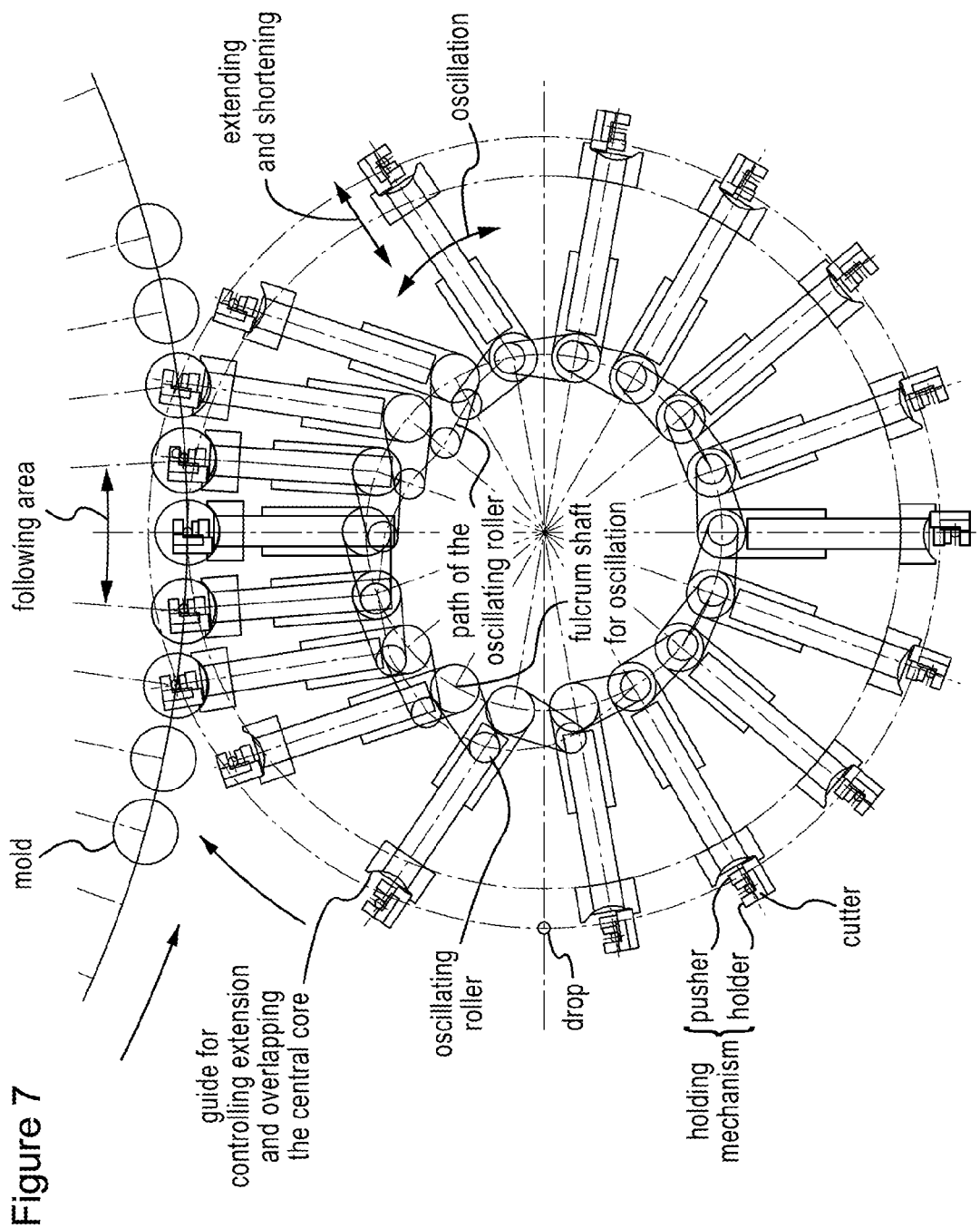
FIG. 7 is a schematic plain view which illustrates an example of the embodiments in the present invention in which the rotation path of the holding mechanism is made to overlap with that of the molding die with the use of oscillation.

A specific example is shown in FIG. 7, wherein a holding mechanism on a rotary- and movable type drop supply can move along a guide, when the holding mechanism rotates, the holding mechanism approaches the rotating molding die, while the holding mechanism is moved along the guide by a cam attached and fixed to the rotary drop supply and a cam follower integrated into the holding mechanism, as in the case of the major example shown in the above.

Further, it is a method or device for supplying the drop in molding die follow-up manner, wherein the holding mechanism then follows the position of the molding die while the holding mechanism and the guide are oscillated; the rotation path of the holding mechanism is made to overlap with that of the molding die completely within a determined area by an additional action of oscillation, and the movement of the holding mechanism is made to follow that of the molding die completely or the movement of the molding die is made to follow that of the holding mechanism completely.

As shown in FIG. 7, when a wheel of the rotary- and movable type drop supply rotates at a transmission and driving system (not shown) such as a belt drive or a gear drive, an oscillating roller is also rotatingly driven on the path defined by path control by the cam or the like, the holding mechanism is oscillated by the motion of the oscillating roller using the fulcrum shaft for oscillation as the base point, and further, the position of the holding mechanism is made to overlap with that of the molding die more accurately also by the action of extending and shortening of the holding mechanism by the guide (a linear slide) and so on attached to the support which supports the holding mechanism.

The oscillation of the holding mechanism is performed as movement of the oscillation distance. The preliminarily set oscillation distance is refer to the distance which is set according to the design of the device for supplying a drop and further added coordination by the experimental device driving.

Meanwhile, as in the case of the above major example, it is preferable that the holding mechanism is supported by the support, the holding mechanism or the support is biased toward the exterior of the wheel of the rotary- and movable type drop supply on which the holding mechanism is attached by springs. Then, a guide for controlling extension and overlapping the central core provided on the holding mechanism or the support is set so that the guide abuts on the stopper for controlling extension and overlapping the central core attached to the rotary type and thereby it does not protrude over the path of the molding die at least in the range of the following and that the position of the holding mechanism is overlapped exactly with that of the molding die. Outside the range of the following, the holding mechanism or the support is returned to the original rotation path.

As above, the position of the mold is overlapped with that of the holding mechanism by the extending and shortening action while the holding mechanism is oscillated.

Meanwhile, the method of biasing, control of extending and shortening, and oscillation of the holding mechanism explained above merely indicates examples, and they are not limited to these examples. For instance, not a spring but an air cylinder may be used to apply force.

In addition, a cam follower may be provided on the holding mechanism, and the holding mechanism may be extended and shortened by the path of the cam for extending and shortening the holding mechanism. Further, the holding mechanism may be extended and shortened, or oscillated with an electric drive system such as a servomotor.

As long as the position of the holding mechanism outside the following zone is made to overlap with the position of the extrusion die head of the extruder, the other positions of the holding mechanism can be placed anywhere.

To further describe in FIG. 7, the rotating hub (or the wheel) is equipped with one or more of oscillating shafts. Each of the oscillating shafts is equipped with an oscillating arm in L shape (or inverted-L shape). The crossing point of longer line and shorter line of L shape is the oscillation center (the oscillating shaft), the cam follower is equipped at the end of the shorter line of the L shape, and the cam follower oscillates around the oscillating shaft following the fixed cam when the hub rotates. The longer line of the L shape is equipped with the guide (the linear slide) and the holding mechanism is positioned at the edge of the guide. The holding mechanism slides along the guide while the holding mechanism is pushed outward of the rotating hub by the spring or the like.

7-2. Utilization of the Path Around an Eccentric Circle (1)

On the contrary to the major example of the mechanism for making the rotation path of the holding mechanism overlap with that of the molding die as mentioned above, the path around an eccentric circle is used in stead of the path of the center of the circle as a rotating equipment of the rotary- and movable type drop supply in this system, wherein the rotary-type holding mechanism is supported by a fixing member which is moved on the path around the eccentric circle, a rotary moving path of the fixing member is controlled by the control guide within a determined area in which the fixing member approaches the rotating molding die, and thereby the rotation path of the holding mechanism is made to overlap or nearly overlap with that of the molding die to make the movement of the holding mechanism follow that of the molding die or make the movement of the molding die follow that of the holding mechanism.

Figure 8:
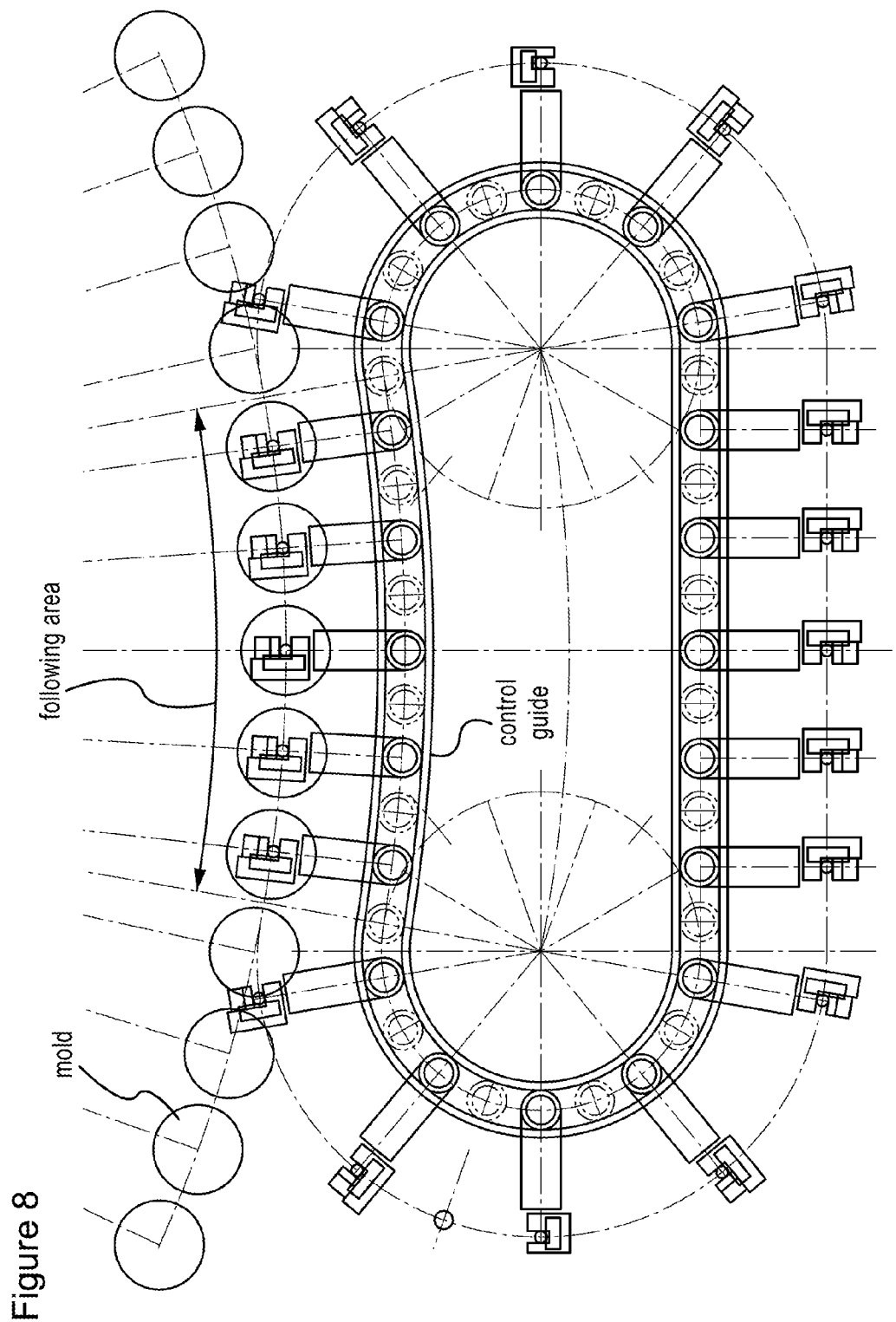
FIG. 8 is a schematic plain view which illustrates an example of the embodiments in the present invention in which the rotation path of the holding mechanism is made to overlap with that of the molding die with the use of the path around the eccentric circle and the control guide.

In FIG. 8, both the shape of what is termed an eccentric circle and the specific example thereof are exemplified. This is an application example of the embodiment of the mold following that uses the path around the eccentric circle; and it is a device to make the position of the holding mechanism overlap with that of the molding die accurately by the action of the controlling guide using the path around the eccentric circle that rotates horizontally. A path around an eccentric circle is a path having a shape of horizontally long ellipse (not oval) in which two circles having different center positions are placed at the both ends, as illustrated in FIG. 8. Meanwhile, the path around the eccentric circle may also be a path around an eccentric circle that rotates vertically.

It is a method or device for supplying a drop in molding die follow-up manner; wherein the holding mechanism on the rotary- and movable type drop supply is supported by the fixing member which is moved by horizontal rotation on the path around the eccentric circle, the rotary moving path is controlled to overlap with the rotation path of the molding die by the controlling guide within a determined area in which the fixing member approaches the rotating molding die, thereby the path is preferably deformed so that the rotation path of the holding mechanism overlaps with circular arch shape of the rotation path of the molding die and the rotation path of the holding mechanism is made to overlap with that of the molding die completely to make the movement of the holding mechanism follow that of the molding die completely or to make the movement of the molding die the follow that of holding mechanism completely.

Specifically, it is adopted as a system, wherein the rotary type holding mechanism is supported by extending and shortening means provided on a media such as a belt and a chain in a wrapping driving device such as a belt driving device and a chain driving device, at least a part of the circular path whose concentric circle is the same as the circular path on which the movable molding die traces is comprised in the path on which the media traces, and thereby the path of the holding mechanism overlaps or nearly overlaps with that of the molding die in a range of the circular path of the concentric circle.

The circular path whose concentric circle is the same as that of movable molding die on which the media traces can be defined by the controlling guide in circular arch form placed between a belt pulley and a sprocket wheel or the like of the wrapping driving device.

7-3. Utilization of the Path Around the Eccentric Circle (2) and (3)

This is a system of other embodiment for utilizing the path around the eccentric circle as a rotating equipment of the rotary- and movable type drop supply in the major example of the mechanism for making the rotation path of the holding mechanism overlap with that of the molding die as mentioned above, the holding mechanism on the rotary- and movable type drop supply can move along the guide which is moved with rotation on the path around the eccentric circle, when the holding mechanism rotates, the holding mechanism is made to approach the rotating molding die while it moves along the guide by the cam provided and fixed outside the rotary- and movable type drop supply and the cam follower integrated into the holding mechanism, and thereby the rotation path of the holding mechanism is made to overlap or nearly overlap with that of the molding die within a determined area to make the movement of the holding mechanism follow that of the molding die or to make the movement of the molding die follow that of the holding mechanism.

Figure 9:
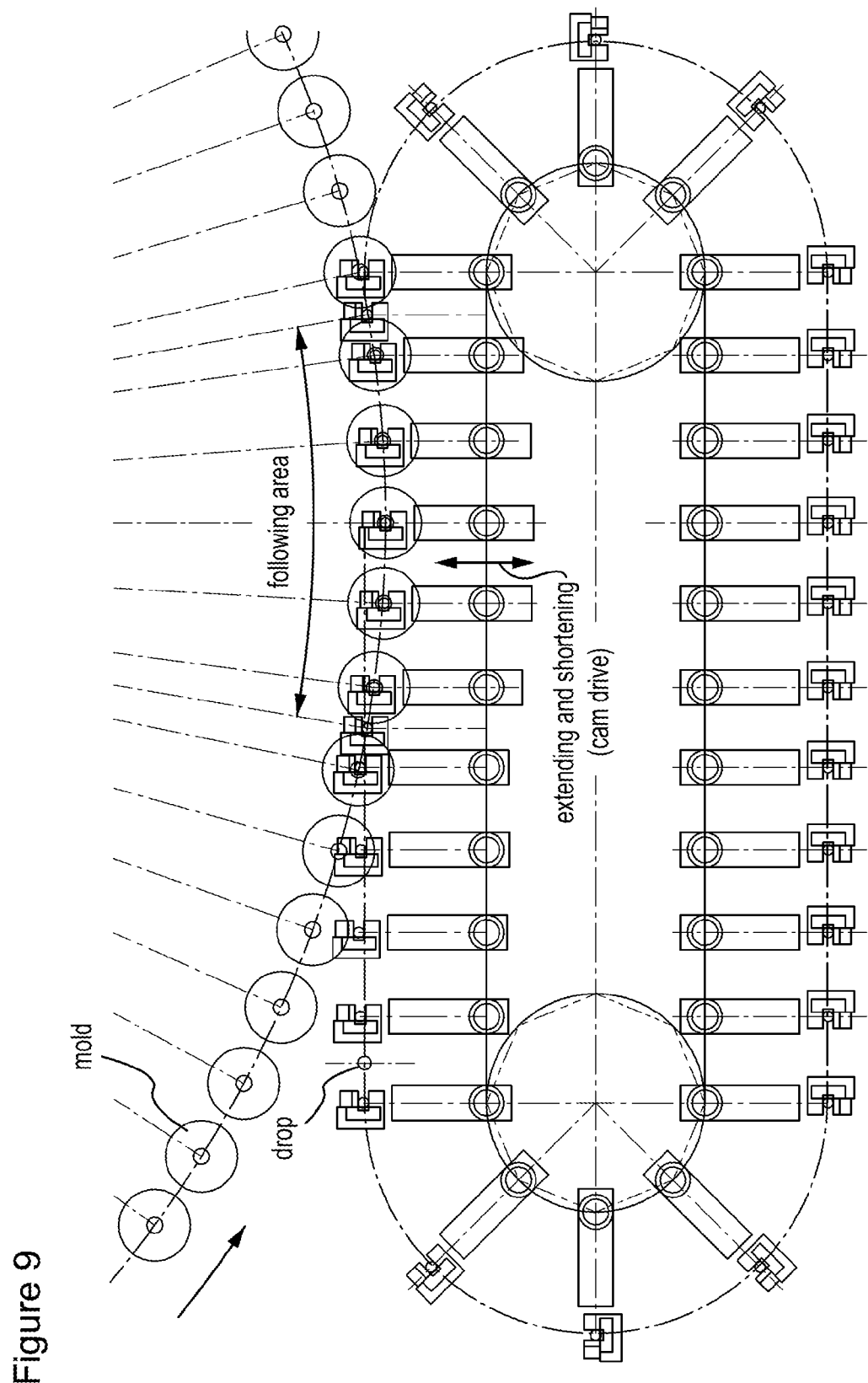
FIG. 9 is a schematic plain view which illustrates an example of the embodiments in the present invention in which the rotation path of the holding mechanism is made to overlap with that of the molding die with the use of the path around the eccentric circle.

In FIG. 9, a specific example of utilization of the path around the eccentric circle (2) is exemplified. This is other application example of the embodiment for utilizing the path around the eccentric circle and a device for making the position of the holding mechanism overlap with that of the molding die accurately by using the path around the eccentric circle that rotates horizontally, however, unlike utilization of the path around the eccentric circle (1), it is a device for making the position of the holding mechanism overlap with that of the molding die accurately by the action of the cam and the cam follower and guide without using the controlling guide similar to the major examples above.

This is a method or device for supplying a drop in molding die follow-up manner; wherein the holding mechanism on the rotary- and movable type drop supply can move along the guide that is moved with horizontal rotation on the path around the eccentric circle as illustrated, (meanwhile, tilt at a determined angle is not especially necessary in the embodiment for utilizing the eccentric circle), when the holding mechanism rotates, the holding mechanism is made to approach the rotating molding die while it is moved along a guide by the cam provided and fixed on the rotary- and movable type drop supply and the cam follower integrated into the holding mechanism, and thereby the rotation path of the holding mechanism is made to nearly overlap with that of the molding die within a determined area to make the movement of the holding mechanism follow that of the molding die or to make the movement of the molding die follow that of the holding mechanism.

Meanwhile, as in the case of the major examples above, the holding mechanism is supported by the support, the support is preferably tensed by the tension spring toward the exterior of the wheel on which the holding mechanism is attached, the cam follower is set to abut on the inner peripheral side of the cam to prevent the cam follower from protruding over the cam, the support moves inward and outward along the guide set on the curve of the cam, the support moves along the guide while it approaches the rotating molding die, and thereby the rotation path of the holding mechanism is made to overlap with that of the molding die almost completely in the determined area to make the movement of the holding mechanism follow that of the molding die.

The rotation path of the movable molding die is a circular path, and the holding mechanism on the rotary- and movable type drop supply in molding die follow-up manner can choose an embodiment in which rotation or rotation including oscillation can be performed in a freely extendable rotation radius.

Utilization of the path around the eccentric circle (3) is other application example of the embodiment for utilizing the path around the eccentric circle, which is a method or device for supplying a drop in molding die follow-up manner, and this example differs from utilization of the path along the eccentric circle (1) or (2) only on this point that the path around the eccentric circle that rotates vertically is used.

7-4. A Method for Positioning the Rotating Axis of the Drop Supply and that of the Molding Die on the Same Line (1) and (2).

Figure 11:
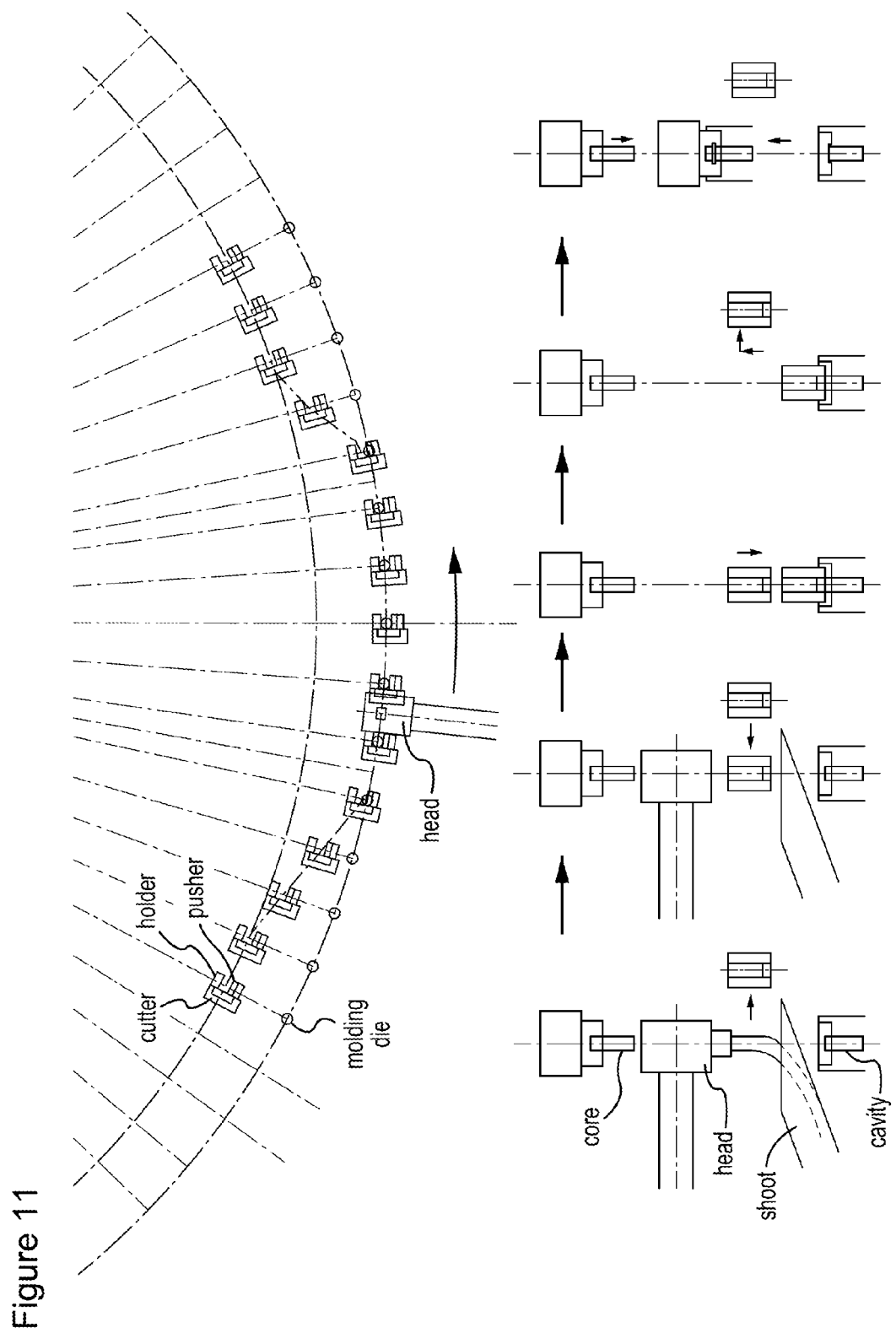
FIG. 11 is a schematic plain view which illustrates an example of the embodiments in which the rotation path of the holding mechanism is made to overlap with that of the molding die, wherein the holding mechanism and the molding die are provided on the same wheel.
Figure 12:
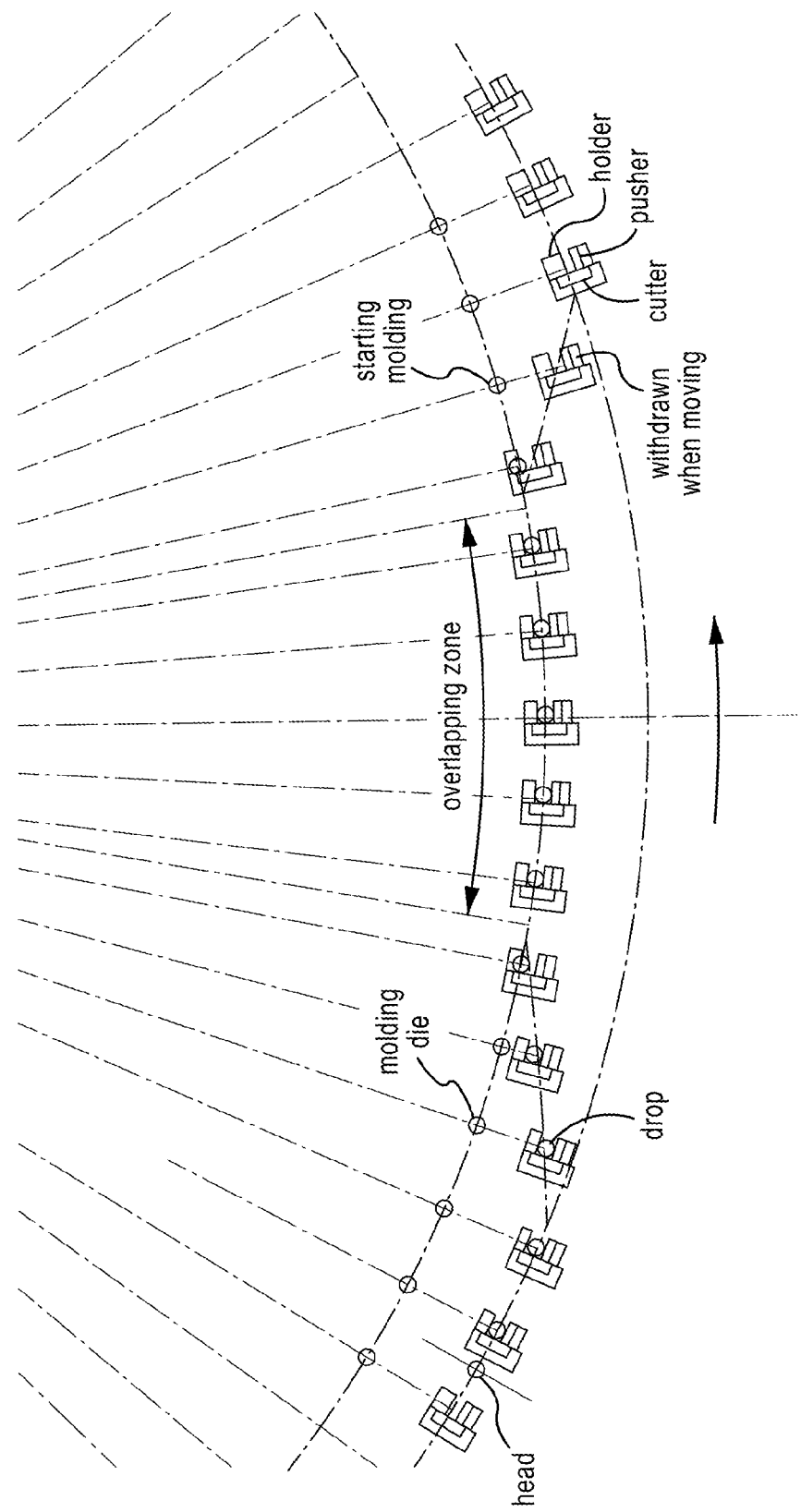
FIG. 12 is a schematic plain view which illustrates an example of the embodiments in which the rotation path of the holding mechanism is made to overlap with that of the molding die, wherein the holding mechanism and the molding die are provided on the same wheel.

In order to overlap the rotation path of the holding mechanism with that of the molding die, there is a method for positioning the rotating axis of the drop supply and that of the molding die on the same line, as shown in FIGS. 11 and 12. The rotation path of the holding mechanism can be made to overlap with that of the mold by using this positioning and the cam and the guide as described in the above (6).

INDUSTRIAL APPLICABILITY

The method and device for supplying drops of the present invention allows accurate and rapid supply and insertion of the drops, and production of moldings without the loss of substandard article when a molding device using rotating material supply by extrusion and a rotary-type compression molding machine in combination, further it can fasten the molding cycle for raising the production efficiency such as by raising the rotation rate of the rotary-type compression molding machine. Therefore, the method and device for supplying drops of the present invention is useful for production of preforms and so on for molding synthetic resin containers.

What is claimed is:

1. A device for forcibly inserting a drop of a molding material into a concave of a molding female die in a compression molding machine, which comprises:
    a resin extruder to form a synthetic resin molding material into soften and molten condition by heating plasticization, the resin extruder comprising an extrusion opening formed at the edge of an extrusion die head attached to the resin extruder,
    a holder disposed at a synthetic resin accepting position opposing to the extrusion die head, for holding the synthetic resin molding material extruded from the extrusion opening,
    a cutter for cutting the synthetic resin into a determined quantity of the drop, and
    a conveyer to transport the drop into a discharging position provided on the molding female die, the conveyer comprising a forcible releaser to forcibly release the drop into the concave of the molding female die.

2. The device for forcibly inserting a drop into a concave of a female mold according to claim 1, wherein forcible releaser comprises a lift block for lowering the holder.

3. The device for forcibly inserting a drop into a concave of a female mold according to claim 1, wherein forcible releaser comprises oscillator to oscillate the holder.

4. The device for forcibly inserting a drop into a concave of a female mold according to claim 1, wherein the conveyer forcible releaser shifts a path of the holder in order to assist the drop of the drops.

5. A device for continuously supplying a drop of a molding material into a moving molding die in a compression molding machine which is a device for supplying a drop in molding die follow-up manner, comprising:

a molding die rotating along a first rotation path; and a holder rotating on a second rotation path abutting the first rotation path in a plan view to approach the rotating molding die, wherein one of the first rotation path and the second rotation path is configured to mechanically conform to the other of the first rotation path and the second rotation path so as to form a following area extending before and after a release point, and the drop is held and conveyed by the holder and released at the release point, to insert and supply the drop into a concave of the molding female die.

* * * * *